United States Patent [19]

Diaz

[11] Patent Number: 4,497,784
[45] Date of Patent: Feb. 5, 1985

[54] SOLUTION REMOVAL OF HCN FROM GASEOUS STREAMS, WITH HYDROLYSIS OF THIOCYANATE FORMED

[75] Inventor: Zaida Diaz, Houston, Tex.

[73] Assignee: Shell Oil Company, Houston, Tex.

[21] Appl. No.: 556,255

[22] Filed: Nov. 29, 1983

[51] Int. Cl.$^3$ .................. C01C 3/00; C01C 1/02; C01B 17/16
[52] U.S. Cl. .................. 423/236; 423/237; 423/355; 423/366; 423/437; 423/563; 423/567 R; 423/567 A; 423/571
[58] Field of Search .......... 423/236, 237, 563, 567 A, 423/567 R, 571, 355, 366, 437

[56] References Cited

U.S. PATENT DOCUMENTS

| | | | |
|---|---|---|---|
| 1,853,679 | 4/1932 | Hansen | 423/546 |
| 1,924,206 | 8/1933 | Hansen | 423/236 |
| 1,932,819 | 10/1933 | Hansen | 423/546 |
| 4,098,866 | 7/1978 | Nicklin et al. | 423/236 |

FOREIGN PATENT DOCUMENTS

| | | |
|---|---|---|
| 47-47841 | 12/1972 | Japan. |
| 47-47842 | 12/1972 | Japan. |

Primary Examiner—Gregory A. Heller

[57] ABSTRACT

A process for the removal of HCN from gaseous streams is described, the process being characterized by reaction of the HCN in the gaseous stream with an ammonium polysulfide solution, formation of ammonium thiocyanate, and hydrolysis of the ammonium thiocyanate. Recycle of hydrolysis products is contemplated.

6 Claims, No Drawings

SOLUTION REMOVAL OF HCN FROM GASEOUS STREAMS, WITH HYDROLYSIS OF THIOCYANATE FORMED

BACKGROUND OF THE INVENTION

The presence of hydrogen cyanide (HCN) in various gaseous streams complicates removal of additional impurities, e.g., removal of $H_2S$ or $CO_2$, and poses problems insofar as product quality and pollution control requirements are concerned. In particular, gas streams derived from the gasification of coal generally have significant minor quantities of HCN which must be dealt with before the gas is utilized.

Accordingly, a practical and efficient procedure for removing impurity HCN might have great economic importance. The invention is such a process.

SUMMARY OF THE INVENTION

The invention, therefore, relates to a process for the removal of HCN from gaseous streams containing this impurity, the process comprising contacting or scrubbing the gaseous stream with a solution containing ammonium polysulfide under conditions to react with or convert the HCN and produce a solution containing ammonium polysulfide and ammonium thiocyanate. The gaseous stream, now having a reduced HCN content, is passed out of the contact zone, for use, further treatment, or recovery. At least a portion of the solution containing ammonium polysulfide and ammonium thiocyanate is removed from the contact zone, preferably on a continuous basis, and is hydrolyzed. The hydrolysis is carried out under suitable conditions of temperature and pressure, and ammonia, carbon dioxide, and hydrogen sulfide are produced. These gases may be recycled and/or recovered, if desired, by known techniques. The process is preferably operated continuously.

DETAILED DESCRIPTION OF THE INVENTION

The reactions for the process may be shown, as follows: $2HCN + (NH_4)_2S_x \rightarrow 2NH_4SCN + HS^- + H^+ + S_{x-3}$
$NH_4SCN + 2H_2O \rightarrow CO_2 + H_2S + 2NH_3$
(x=3, 4 or 5)

The particular gas streams treated according to the invention are not critical, as will be evident to those skilled in the art. Any gaseous stream containing HCN and from which it is desired to remove the HCN, and which itself does not react with the ammonium polysulfide or interfere substantially therewith may be treated according to the invention. Gaseous streams or effluents particularly suited to the invention incude fuel gases produced by gasification procedures, e.g., fuel or effluent gases derived from or produced by the gasification of coal, petroleum, shale, tar sands, etc., wherein a significant quantity of HCN is present. In such gasification processes, the gaseous effluents are often quenched with water or gaseous liquids, and gaseous streams derived from stripping the liquids may contain HCN and may also be treated by the invention. The HCN content of such streams may vary, but the invention will preferably be employed with streams having an HCN content of from about 0.002 percent to about 0.1 percent by volume. As indicated, the process of the invention is preferably continuous, i.e., make-up ammonium sulfide or polysulfide is continuously supplied to the contact zone, and a portion or "bleed" of ammonium thiocyanate solution is continuously removed from the contact zone. The volumes of make-up and bleed will depend, inter alia, on the concentration of HCN in the gaseous stream, and thus cannot be given with precision. Those skilled in the art may suitably adjust solution flows.

Suitable conditions, i.e., appropriate temmperature and pressure, sufficient contact time, proper pH, and appropriate concentrations of ammonium polysulfide and water are employed to achieve the HCN conversion to ammonium thiocyanate. Temperatures in the contact zone of from about 2° C. to about 80° C. may be employed, with temperatures of from 25° C. to 60° C. being preferred. The pH of the ammonium polysulfide solutions will range from about 8 to 10, preferably 8.5 to 9.5, and concentrations of ammonium polysulfide will preferably range from 0.01 to 1, preferably 0.1 to 0.5 moles per liter. The most important variable controlling HCN removal and conversion is the amount of elemental sulfur available to maintain the polysulfide concentration. In general, the polysulfide solution will have at least a stoichiometric amount of the polysulfide sulfur with respect to the HCN, and preferably up to 3 or 4 times the stoichiometric amount. Elemental sulfur may be supplied in the contact zone to maintain this concentration. $H_2S$ and $NH_3$ in the feed gas do not interfere with HCN removal or conversion, and $NH_3$ may actually help rejuvenate the solution. The ammonium polysulfide solution may be supplied on a continuous basis to the contact zone as make-up, or steps can be taken, in some cases, to generate the ammonium polysulfide to some extent in situ. Contact times may range from 1 to 8 minutes, preferably 3 to 5 minutes. Those skilled in the art may select suitable contact or scrubbing devices to carry out the contacting or scrubbing.

As the HCN is removed from the gaseous stream by reaction with the ammonium polysulfide solution, at least a portion of the solution, now containing ammonium thiocyanate, is removed. This portion is sent to a hydrolysis zone wherein it is hydrolyzed to produce $NH_3$, $H_2S$, and $CO_2$. Sufficient water must be present or supplied for the hydrolysis. Temperatures in the hydrolysis zone are important, and will range from about 200° C. to about 300° C. In general, pressures will range from about 20 to about 100 atmospheres. The $H_2S$, $NH_3$, and $CO_2$ produced from the hydrolysis may be recovered and recycled, or treated further, as desired.

As will be recognized by those skilled in the art, any sulfur in the portion in the hydrolysis zone will melt at the temperatures employed. Provision may be made for recovery and suitable recycle of the sulfur for ammonium polysulfide make-up or concentration maintenance. The residual stream, after the ammonium thiocyanate hydrolysis, and after any sulfur separation, may be treated further or used in other plant operations, etc.

In order to demonstrate the removal of HCN from a gaseous stream, the following experiments were conducted.

PROCEDURE

A stream of nitrogen containing 1 percent by volume HCN and 0.5 percent by volume $H_2S$ was passed at atmospheric pressure at a rate of 2 volumes of gas per volume of solution per minute into a flask containing a 0.3M solution of ammonium sulfide having 1.56M sulfur suspended therein. The pH of the solution was 8.9, and the volume of gas treated was about 210 volumes of gas per volume of solution. Temperature of the system was maintained at about 80° C. Greater than 99.8 percent of the HCN was removed, and conversion to thiocyanate approached 100 percent.

In a similar manner, a series of runs was made, and the conditions and results are, as set out below:

Solution: 0.30M $(NH_4)_2S$.
Gas Composition: 1% HCN in $N_2$; $H_2S$ and $NH_3$ content as indicated below.
Gas Flow Rate: 290–330 cc/min.
Pressure: 1 atm.
Volume of HCN/Volume of Solution ~ 2.1 cc/cc.

| T (°C.) | Elemental Sulfur in Solution (M) | Initial Solution pH | $NH_3$ in Feed (% v) | $H_2S$ in Feed (% v) | HCN Removed (%) | HCN Converted (%) |
|---|---|---|---|---|---|---|
| 25 | 1.6 | 8.8 | 0 | 0.55 | >99.8 | 99 |
| 50 | 1.6 | 9 | 0 | 0.45 | >99.8 | 97 |
| 80 | 1.6 | 8.9 | 0 | 0.55 | >99.8 | 100 |
| 50 | 1.6 | 7 | 0 | 0.55 | >99.4 | 98 |
| 50 | 0.3 | 9 | 0 | 0.55 | >99.8 | 97 |
| 50 | 0.06 | 9 | 0 | 0.55 | >98 | 76 |
| 50 | 0.5 | 9 | 1 | 0.55 | >99.8 | 100 |
| 50 | 0.5 | 7 | 1 | 0.55 | >99.4 | 96 |

What is claimed is:

1. A process for removing hydrogen cyanide from a gaseous stream containing hydrogen cyanide comprising
   (a) contacting said gaseous stream in a contact zone with a solution containing ammonium polysulfide under conditions to convert hydrogen cyanide, and producing a solution containing ammonium polysulfide and ammonium thiocyanate, and a gas stream having reduced hydrogen cyanide content;
   (b) removing solution containing ammonium polysulfide and ammonium thiocyanate from the contact zone, and hydrolyzing the ammonium thiocyanate in the removed solution to produce ammonia, hydrogen sulfide, and carbon dioxide.

2. The process of claim 1 wherein the gaseous stream comprises a stream derived from the gasification of coal.

3. The process of claim 1 in which the amount of ammonium polysulfide solution supplied in step (a) contains at least a stoichiometric amount of polysulfide sulfur with respect to the hydrogen cyanide.

4. The process of claim 2 in which the amount of ammonium polysulfide solution supplied in step (a) contains at least a stoichiometric amount of polysulfide sulfur with repsect to the hydrogen cyanide.

5. A process for removing hydrogen cyanide from a gaseous stream containing hydrogen cyanide comprising
   (a) contacting said gaseous stream in a contact zone with a solution containing ammonium polysulfide under conditions to convert hydrogen cyanide, and producing a solution containing ammonium polysulfide, sulfur, and ammonium thiocyanate, and a gas stream having reduced hydrogen cyanide content;
   (b) removing solution containing ammonium polysulfide, sulfur, and ammonium thiocyanate from the contact zone, and hydrolyzing the ammonium thiocyanate in the removed solution in a hydrolysis zone to produce ammmonia, hydrogen sulfide, and carbon dioxide; and
   (c) recovering sulfur from the hydrolysis zone.

6. The process of claim 5 wherein the gaseous stream comprises a stream derived from the gasification of coal.

* * * * *